July 12, 1932.  R. VON FROMMER  1,867,482
TOOL POST
Filed Feb. 6, 1929    2 Sheets-Sheet 1

R. Von Frommer
INVENTOR

By Marks & Clark
ATTYS

July 12, 1932.    R. VON FROMMER    1,867,482
TOOL POST
Filed Feb. 6, 1929    2 Sheets-Sheet 2

R. Von Frommer
INVENTOR by Marks & Clark
Att'ys

Patented July 12, 1932

1,867,482

UNITED STATES PATENT OFFICE

RUDOLF von FROMMER, OF BUDAPEST, HUNGARY

TOOL POST

Application filed February 6, 1929, Serial No. 337,956, and in Hungary February 13, 1928.

This invention relates to a tool holder with which is incorporated a raising and sinking device for the cutting tool.

It is well known that with lathes and other machine tools it is of utmost importance that the edge of the cutting tool should be adjusted in the proper level with respect to the workpiece. To attain this end various devices have been proposed all suffering from the common disadvantage that they are, without exception, inappropriate for effecting a really exact adjustment, since the raising and lowering of the tool is effected with each of the known devices by hand and not by a positive movement.

The tool post or tool holder according to the invention and having a tool raising and sinking device incorporated therewith differs from the known devices in that the raising and sinking of the tool is effected with the utmost exactness by a ground plate mounted for positive movement in the support the working face of the said ground plate being made in the form of a double threaded helicoidal surface whereby the ground plate is driven by an endless screw device or the like. In order that the tool holder together with the tool may not be turned with respect to the workpiece during the raising or lowering of the tool the same is provided, according to the present invention, with a brake mechanism. Furthermore, in order that a tool narrower than the slot of the sleeve of the tool holder may not perform any lateral movement in the said slot the same is fixed by a screw or the like.

As it is well known, the adjustment with the known tool posts has been made according to the centres of the lathe, but this sort of adjustment is either made impossible when a workpiece is clamped between the centres or is made extremely difficult. By the improvements according to the invention these difficulties are also overcome in that a detachable gauge is provided on the tool post to which the tools may be adjusted with perfect accuracy.

In the accompanying drawings one form of the tool holder according to the present invention is shown by way of example.

Figures 8, 10:
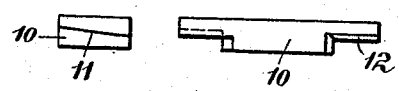
Fig. 8 is a side elevation of the compensating plate.

Fig. 10 a front view of the same.

Figure 11:
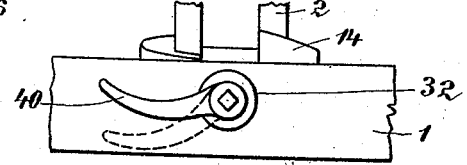
Figure 12:
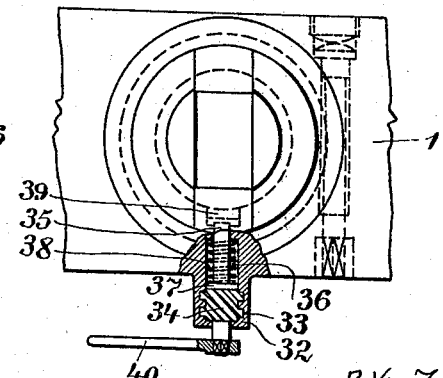
Figure 5:
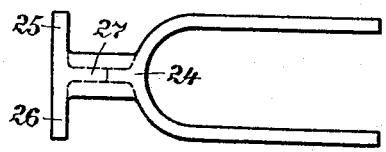
Fig. 5 is a top view of the gauge.

Figs. 11 and 12 show a form of the tool holder in which the advantages of the screw operated and spring controlled brake device are combined.

Figure 6:
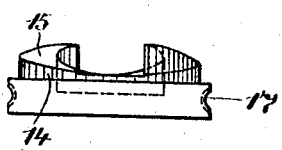
Fig. 6 is a side view of the ground plate.
Figure 7:
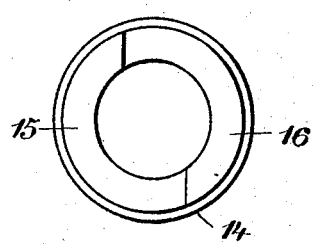
Fig. 7 is a top view of the ground plate.
Figure 9:
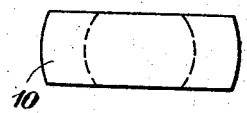
Fig. 9 is a top view.

Referring now to the drawings in the support 1 the tool post 2 is rotatably mounted and is provided as usual with a clamping screw 3. As during the adjustment according to height the clamping screw may not be tightened, a pressure piece 4 is provided within the said clamping screw for temporarily securing the tool, and the downward movement of the said pressure piece 4 under the action of the spring 6 is checked by a screw 5. By means of the screw 9 the tool 8 which does not fill up the slot in the tool holder 2 may be laterally secured in the said slot. The tool 8 rests on a compensating plate 10 (Figs. 8, 9 and 10) the surfaces 11 and 12 of which are exactly symmetrical and the counter images of each other. The surfaces 11 and 12 bear upon the ground plate 14, mounted for positive movement in the support 1 and secured thereto by the covering ring 13, the said ground plate 14 being provided with two screw thread shaped paths 15 and 16 (Figs. 6 and 7) formed in such a manner that a straight line laid across the centre of the said ground plate will be horizontal in every height level, so that by the surfaces 15 and 16 a double screw thread is formed. On the circumference of the ground plate 14 there is provided a gearing 17 in which engages the worm 18. The latter is preferably rotated by means of a detachable crank 19 or the like whereby the ground plate 14 is positively turned and by this turning the compensation plate 10 and therewith the tool 8 are raised or lowered on the screw thread surfaces of the ground plate 14. By this means the tool may be adjusted as to height with the utmost accuracy, in fact with an exactness that may only be attained by means of a screw thread adjustment but in no other manner.

Figure 1:
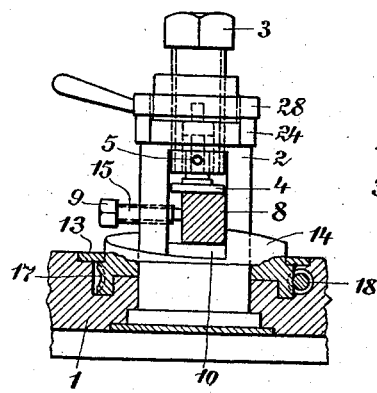
Fig. 1 is a front elevation of the tool post, partly in section.
Figure 2:
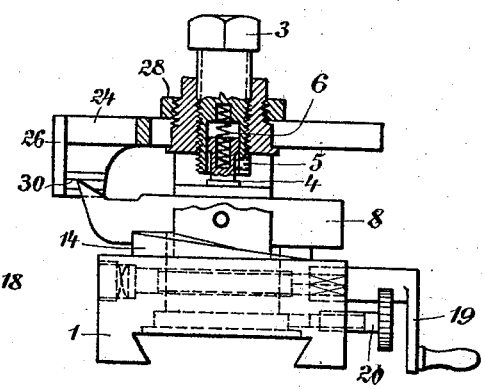
Fig. 2 is a side elevation, partly in section.
Figure 3:
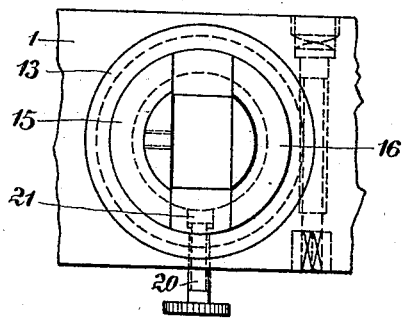
Fig. 3 is a top view of the tool post with a screw operated brake device.
Figure 4:
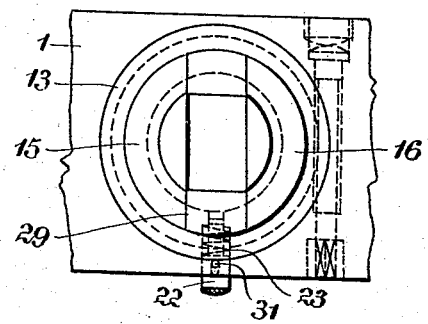
Fig. 4 is the same view showing the tool holder with a spring controlled brake device.

In order that during the raising or lowering of the tool (which operation, of course, may only be performed if the clamping screw 3 is not tightened upon the tool but only the spring controlled pressure piece is acting thereon) the same may not be turned by the rotation of the ground plate from the correct direction in which it has been adjusted with respect to the workpiece, the tool holder is temporarily secured by a braking action exerted upon it either by the brake block 21 operated by the screw bolt 20 (Fig. 3) or by the brake block 29 controlled by the push-button 22 (Fig. 4). The push-button 22 is subject to the action of a spring 23 and its outward movement is limited by the pin 31. When the correct height has been attained this temporary fixing becomes superfluous because the tool is then secured by means of the clamping screw 3. To supersede the temporary fixing in the form shown in Fig. 3 the screw 20 is loosened, and in the form shown in Fig. 4 the button 22 is released, whereupon the latter is returned into its initial position by the spring 23. In the form shown in Figs. 11 and 12 a third form of the brake arrangement is shown. The support 1 is provided with an extension 32 in which the steep nut thread 33 is cut. The nut thread 33 cooperates with the corresponding screw thread 34 of the brake rod 35. The pitch of the screw thread 34 is such that the spring 38 inserted between the bottom of the bore 36 of the extension 32 and the collar 37 of the brake rod 35 keeps the brake rod and therewith the brake block 39 normally in its inoperative position. If, however, by the arm 40, fastened to the outer end of the brake rod 35, the latter is shifted inwardly by medium of the screw thread 34 and against the action of the spring 38, the brake block 39 is applied. If the pressure arm 40 is disengaged the whole of the brake mechanism is thrown backwards by the spring 38 and the brake is released.

In order that the desired correct height adjustment of the tool may be determined with accuracy and independently of the centres of the lathe a gauge 24 is secured on the tool holder 2, preferably by means of the nut 28. The gauge 24 may be turned into any position on the tool holder 2, and that portion of the same by which it is fastened on the tool holder is preferably fork shaped. For facilitating the adjustment of the tools the gauge 24 is provided with extensions 25, 26 and 27 on which the height marks 30 are indicated, and thereby a tool of any form and direction may be adjusted to the desired height by means of the correct height mark 30. After the correct adjustment of the tool the gauge 24 may easily be removed by losening the nut 28. By this arrangement the correct adjustment as to height of the tools may be effected not only independently of the centres but also with the greatest accuracy, since the edges of the tools are not adjusted with respect to points but with respect to the marking lines 30 indicated on the extensions 25, 26 and 27.

Claim:—

A tool holder comprising a support, a tool post rotatably mounted in the said support, a ground plate rotatable in the support and having a double threaded helicoidal working surface, a worm gear for driving said ground plate, a compensating plate for supporting the tool and resting on the said ground plate, a clamping screw for securing the tool in the vertical direction, a spring controlled pressure device adapted to temporarily secure the tool in the vertical direction, a gauge adapted to mark the pitch of the centres of the lathe rotatably mounted on the tool post, and a nut for securing the said gauge in any desired position thereof.

In testimony whereof I have affixed my signature.

RUDOLF von FROMMER.